United States Patent [19]

Braun et al.

[11] 4,035,981
[45] July 19, 1977

[54] ASEPTIC PACKAGING

[75] Inventors: Johannes Braun, Roggwil; Winfried Sturm, Goldach, both of Switzerland

[73] Assignee: Alcan Research and Development Limited, Montreal, Canada

[21] Appl. No.: 638,175

[22] Filed: Dec. 5, 1975

[51] Int. Cl.² .............................................. B65B 55/08
[52] U.S. Cl. .................................. 53/21 R; 53/111 R; 53/167
[58] Field of Search .................... 53/21 R, 111 R, 167

[56]  References Cited
U.S. PATENT DOCUMENTS

| | | | |
|---|---|---|---|
| 3,383,831 | 5/1968 | Goldsmith et al. | 53/167 |
| 3,478,489 | 11/1969 | Meisner | 53/167 |
| 3,583,132 | 6/1971 | Doyen | 53/167 X |
| 3,747,296 | 7/1973 | Zausner | 53/167 |
| 3,832,827 | 9/1974 | Lemelson | 53/111 R |
| 3,911,640 | 10/1975 | Rausing | 53/167 X |

*Primary Examiner*—Travis S. McGehee
*Attorney, Agent, or Firm*—Cooper, Dunham, Clark, Griffin & Moran

[57]  ABSTRACT

A method of aseptically packaging pre-sterilized foodstuffs is described. The method used 'dry' radiation methods for sterilizing packaging material in an aseptic workspace either before or after construction of the container as such. The internal surfaces of the packaging material supplied to the workspace are coated with a radiation resistant lacquer. After sterilization the containers are filled with food such as milk or yoghurt and heat sealed.

12 Claims, 2 Drawing Figures

U.S. Patent  July 19, 1977  4,035,981
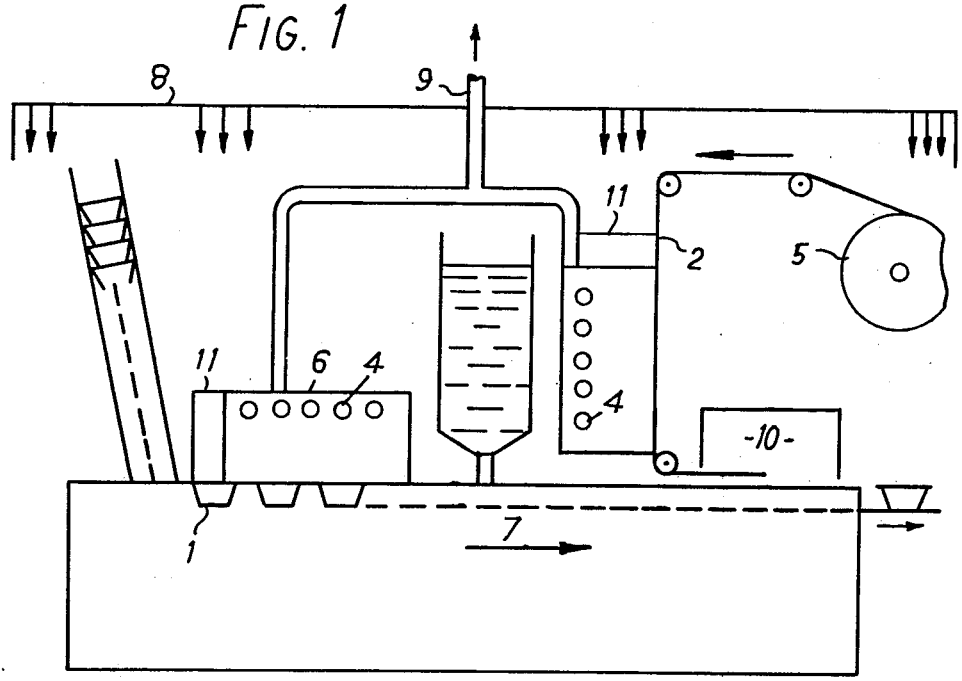
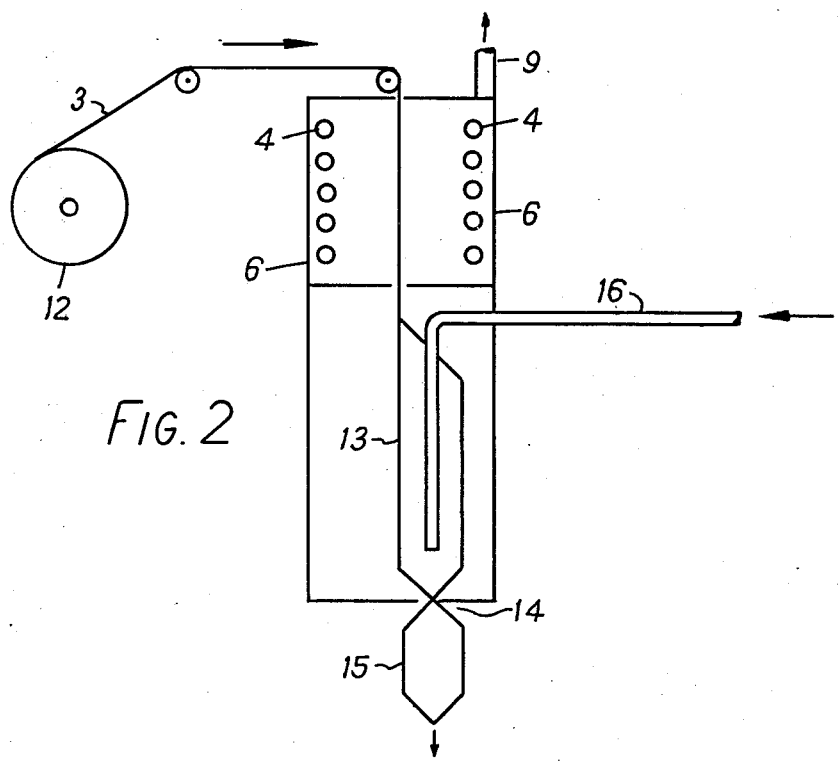

ASEPTIC PACKAGING

This invention relates to packaging techniques and particularly to a method of aseptic packaging of food.

Aseptic packaging is a technique whereby a sterile material, e.g., a foodstuff, is put into a pre-sterilized container under sterile conditions and then the container is closed for example with a pre-sterilized lid. The technique is distinguished from previous packaging techniques to produce sterilized packed products in that the packing procedure is performed on and with sterile materials under sterile conditions rather than on and with non-sterile materials and/or under non-sterile conditions and the subsequently sterilizing the packaged materials. The main disadvantage with such post-sterilization techniques is that especially in packing foods, the sterilization is performed by heating which tends to produce flavour changes in the packed food.

Aseptic packaging has been proposed to overcome this difficulty. To date the principal methods proposed to sterilize the containers and lidding material have involved 'wet' or chemical treatment. Wet techniques are difficult to programme into continuous line operation. We have recently developed techniques for on-line sterilization of container and lidding material(s) by 'dry' techniques using ultra violet (U.V.) light, $\beta$ and $\gamma$ radiation. These 'dry' sterilization methods are well suited to continuous production of aseptically packaged materials. The term "dry-sterilizing radiation" will be used herein to designate generically these three types of radiation, viz. ultraviolet light, beta rays, and gamma radiation.

In aseptic packaging the containers must be adequately sealed to prevent subsequent contamination of the contents. It is usual to use heat sealing techniques to hermetically seal the containers after filling. The hermetic heat seal can be provided either by sealing together layers of a suitable lacquer coated on the container and/or lidding material or by welding plastics layers on the container and lid together.

The present invention relates to the use of heat-sealable lacquers in aseptic packaging, where sterilization of the container body and/or lid is to be performed by a dry method involving irradiation. These lacquers are most conveniently based on vinyl chloride or vinylidene chloride polymers or copolymers with vinyl acetate. Medium and high molecular weight polyesters can also be used. Layers of such lacquers are flexible and adhere firmly to packaging material substrates such as aluminium foil and plastics laminates. Substrates coated with them are thus capable of undergoing the shaping necessary to produce containers. The lacquers are corrosion resistant, heat-sealable at relatively low temperature and are both fairly cheap and economical in use.

However, polyvinyl polymers and copolymers do not resist the effect of beta, gamma or U.V. radiation, since, among other reactions, chlorine atoms are split off in the form of hydrogen chloride. As a consequence the lacquer, when subjected to radiation, can give off an unpleasant odour with accompanying yellowing, embrittlement and loss of thermoplasticity and ceaes to be heat-sealable. In many cases, a rise of the sealing temperature by as little as 20° to 25° cannot be tolerated. As a result of irradiation, polyvinyl mixed polymers lose their originally firm adherence to webs of metallic material, e.g., aluminium foil, and in extreme cases the lacquer film can become detached from the metal.

The present invention accordingly provides a method of aseptically packaging pre-sterilized products which method comprises sterilizing packaging material, coated on at least one surface thereof with a stabilized heat-sealable lacquer by ultra violet light, $\beta$ rays or $\gamma$ radiation, in an aseptic workspace, if necessary forming the packaging material into containers, providing the pre-sterilized food in the container and closing the containers by forming a hermetic seal between two coatings of the lacquer.

By the term "stabilized heat sealable lacquer" as used herein we mean a heat sealable lacquer to which has been added a stabilizing agent in an amount effective to prevent a rise of more than 25° C, preferably not more than 20° C and optimally less than 10° C in the heat sealing temperature as a result of exposure to U.V., $\beta$ or $\gamma$ radiation in a dose of 1.5 watt. sec. cm$^{-2}$ in the case of U.V. and 2.5 M-rad in the case of $\beta$ and $\gamma$ radiation.

In the sterilization of container and lid material in aseptic packaging the actual dose and energy of radiation are not especially critical provided that the required sterilization is effected and that a larger dose will not be destabilize the lacquer. Generally doses of from 1.5 to 5 watt seconds of U.V. and 2.5 to 10 M-rads of $\beta$ or $\gamma$ radiation are sufficient to kill of substantially all bacteria or at least to reduce the population of pathogenic and putrefying bacteria to ineffective levels. Such doses can kill fungi but some sporogenic fungi are relatively resistant and could further require exposure. However, in order to maintain line speed it is preferred to use as small a dose as is consistent with sterilization.

The stabilizing agents incorporated into the lacquer are typically low molecular weight polymers such as epoxy resins, saturated polyesters, copolymerized ester resins and polyacrylate resins. The amount used depends on the actual dose of radiation against which the lacquer is intended to be stable. With relatively large amounts of stabilizer the stabilizer itself can contribute substantially towards the heat-sealing properties of the lacquer. Amounts of from 1 to 70% on the total solids content of the lacquer may be regarded as typical preferred compositions depending on specific use.

In the accompanying drawings:

FIGS. 1 and 2 show alternative forms of aseptic packaging plant based on sterilization by U.V. light useful in the process of the present invention.

In FIG. 1 the packing material 1 is fed from a stack in form of preformed containers and moved through the plant as shown by the arrow. The packing material 1 is first exposed to infrared radiation from lamp 11 and subsequently to ultra violet radiation from the discharge tubes 4 in the reflecting casing 6. The containers are filled in portions with the pre-sterilized filling material e.g., yoghurt or cream at the filling station 7. The lidding material 2, e.g., of aluminium 50 - 100 $\mu$m thick, is unwound from a reel 5 and is taken first through an infrared and an ultra violet sterilizer as described above for the container and then fed to the stamping and sealing station 10 where lids are stamped out of the closure foil and the filled beakers are hermetically sealed by hot-sealing Preferably the construction of the reflector is such or further U.V. discharge tubes are provided such that the packaging material is sterilized over its whole surface. The finished portion packages then emerge from the machine towards the right-hand side.

To ensure the sterility of the plant a laminar air flow unit 8 is used to blow sterile air in a curtain down around the plant. This blowing operation could also be effected horizontally from the side.

In FIG. 2 the packing material 3, e.g., a paper-composite packing material laminated with plastic coated aluminium foil, is unwound off reel 12 into a sterilizing chamber which consists of two reflector casings 6 with discharge tubes 4 arranged on both sides of the packing material 3. The packing material 3 is then shaped to form a tube 13 in a device which is not shown, is cross-sealed at 14 and then ejected as finished packing 15. The filling with the liquid filling substance is effected via a tube 16 which is inserted in the formed packing material tube. As in FIG. 1 an IR lamp 11 can also be advantageously included in equipment according to FIG. 2 upstream from the U.V. lamps.

In both FIGS. 1 and 2 the U.V. irradiation chamber is provided with an ozone outlet 9 to avoid contacting the filling, especially food, with ozone resulting from the interaction between the U.V. radiation and oxygen in the air. It is possible to operate such plant using an oxygen-free atmosphere but with adequate removal of ozone (which is not particularly difficult) we have not found this particularly advantageous.

In order to expose the packing material in whichever form it may be used to the wave length spectrum provided by the invention at the right radiation intensity, the discharge tubes 4 have been provided. These are preferably designed according to Swiss Patent Application No. 2994/74 (German O/S No. P 24 12 997.3, British Patent Application No. 8256/75) to which reference is made in this respect.

Under this ray treatment, as described in detail below, all sporogenic and non-sporogenic bacteria are killed within a few seconds at the required rate, whereas mould spores, especially *Aspergillus Niger*, are more resistant.

It is frequently not necessary to destroy all occurring mould spores, as these are neither toxic nor pathogenic and are also practically incapable of multiplying, for instance in sealed milk packages.

If, however, destruction of the mould spores is nevertheless required, that can be achieved by another feature used in the invention, of heating the packing material in the sterile part of the aseptic packaging plant to more than 60° C, e.g., to 80°–90° C. It is a known fact that mould spores are completely destroyed within a few seconds at these temperatures.

A suitable U.V. radiation dose which has proved successful in tests on the packing material is 1.5 Ws/cm$^2$, the measurement referring only to the 253.7 nm-line. Taking practically reasonable feed rates of the packing material into account a radiation intensity of the 253.7 nm-line on the packing material of 0.3 W/cm$^2$ and a dwell time of the packing material inside the U.V. radiation of 5 seconds have proved to be advantageous.

So that apart from the 253.7 nm-line the 184.9 nm- and 194.2 nm-line can also be effective, materials are provided on the discharge tubes 4 at their discharge sections 5 which do not absorb these lines, e.g., made of a high purity quartz such as synthetic quartz. This allows for the transmission of ultra violet light important for germicidal purposes. Also a considerable amount of ozone ($O_3$) is formed from the effect of the U.V. on atmospheric oxygen and this has an additional sterilizing effect on the packing material and the environment.

The precise nature and composition of the lacquer depends on the use to which it is to be put. The following Examples may be regarded as typical resistant lacquer compositions useful in the invention for application to suitable packaging materials.

EXAMPLE 1

The following composition is a lacquer suitable for the internal coating of bag-like materials made for example of aluminium/paper or aluminium plastics composite foils, such as are used in making tetrahedral type packages (e.g., as possible in the apparatus of FIG. 2) or for the internal lacquering of deep-drawn lightweight aluminium containers having specific resistance to U.V. rays and accelerated electrons (beta rays):

6 – 24 parts vinyl chloride-vinyl acetate copolymer
1 – 8 parts poly-n-butyl-methacrylate
1 – 8 parts diepoxide (epoxy resin), molecular weight 300–500
20 – 100 parts solvent mixture Two preferred compositions are:
8 parts vinyl chloride-vinyl acetate copolymer
1 part poly-n-butyl methacrylate
1 part diepoxide, molecular weight 300–500
30 parts mixed solvents.

and
6 parts vinyl-chloride-vinyl acetate
6 parts poly-n-butyl methacrylate
6 parts diepoxide, molecular weight 300–500
50 parts mixed solvents.

This second preferred composition is particularly advantageous for use on continuous line aseptic packaging using U.V. sterilization.

EXAMPLE 2

The following composition is for a lacquer having specific resistance to gamma and beta rays:

12 – 30 parts polyvinyl chloride-vinyl acetate mixed polymer
4 – 12 parts epoxy resin having an epoxy equivalent of approximately 500
0.5 – 2 parts epoxy-functional silane resin
0.5 – 2 parts polyvinyl ether
20 – 100 parts solvent mixture.

A preferred composition is:
22 parts polyvinyl chloride-vinyl acetate mixed polymer
8 parts epoxy resin
1.5 parts silane resin
1 part polyvinyl ether
67.5 parts solvent mixture.

EXAMPLE 3

The following composition is for a lacquer suitable for the U.V. rays-resistant inner coating of aluminium lid foils, which are hermetically sealed on to deep-drawn containers of foil material or on to injection-moulded or deep-drawn plastics containers:

2 – 20 parts vinyl chloride-vinyl acetate copolymer
5 – 25 parts poly-n-butyl methacrylate
40 – 100 parts solvent mixture.

A preferred composition is:
7 parts vinyl chloride-vinyl acetate copolymer
20 parts methacrylate
73 parts solvent mixture.

EXAMPLE 4

The following is a composition of a lacquer suitable for the beta ray-resistant inner lacquering of aluminium lid foils, which are sealed on to deep-drawn containers made of foil or on to injection-moulded or deep-drawn plastics containers:

8 - 24 parts vinyl chloride-vinyl acetate copolymer
2 - 8 parts saturated polyester resin
20 - 100 parts solvent mixture.

A preferred composition, which is also resistant to the action of gamma rays is:

20 parts vinyl chloride-vinyl acetate copolymer
5 parts saturated polyester resin
75 parts solvent mixture.

EXAMPLE 5

This illustrates a stabilized lacquer based on a polyester resin

5 - 20 parts saturated polyester resin
2 - 15 parts copolymerised ester resin
0.5 - 5 parts phthalic acid ester
1 - 10 parts epoxy resin
20 - 50 parts solvent mixture.

A preferred composition is:

13 parts saturated polyester resin
6 parts copolymerized ester resin
1 parts phthalic acid ester
3 parts epoxy resin
70 parts solvent mixture

EXAMPLE 6

This illustrates a lacquer stabilized by a low molecular weight polyester

5 - 15 parts medium molecular weight saturated polyester resin
0.5 - 5 parts low molecular weight saturated polyester resin
20 - 50 parts solvent mixture A preferred composition is:

10 parts medium molecular weight saturated polyester resin
1 part low molecular weight saturated polyester resin
35 parts mixed solvents.

The solvent mixture used in formulating the lacquers used in the invention is typically that used conventionally in lacquers of this type. The particular mixture used in the above Examples is one we have found to be satisfactory and is a mixture of, by volume, 75% methyl ethyl ketone, 15% toluol and 10% methyl acetate.

The vinyl chloride-vinyl acetate copolymers used in the formulations set out in the Examples contained about 1% free carboxyl groups and free hydroxyl groups. The specific nature of the copolymer is not believed to be highly critical but in any particular case the polymer or copolymer will be specifically selected to meet the intended use.

The poly-n-butyl methacrylate used in the Examples are those marketed under the trade name Plexigum. The epoxy resins (diepoxide) are those marketed under the trade names Epikok or Araldite.

The techniques for β and γ radiation sterilization are basically similar to that used for U.V. as described above substituting suitable sources of β and γ radiation for the U.V. discharge tubes. In general β radiation will be provided by an electron accelerator for example as is described in United Kingdom Patent Application No. 42556/75 rather than a radioactive source. Suitable γ radiation will usually be obtained from a radioactive source such as Co-60 or Cs-137. Appropriate measures should, of course, be taken to provide radiation shielding when using β and γ rays. U.V. radiation is preferred because it requires much less shielding than β and γ rays - usually an efficient reflector is adequate.

We claim:

1. In a method of aseptically packaging presterilized products, comprising sterilizing preformed containers of packing material coated on at least one surface thereof with a heat-sealable lacquer, said sterilization including the step of exposing at least said lacquer coated surface to dry-sterilizing radiation in an aseptic workspace, providing said pre-sterilized products in said containers and closing said containers by forming a hermetic seal between two coatings of said lacquer, the improvement which consists in using as the heat-sealable lacquer a lacquer stabilised against radiation damage occurring as a result of exposure to said dry-sterilizing radiation.

2. A method according to claim 1, wherein said containers are closed by forming a hermetic seal between said lacquer on said containers and a coating of stabilized lacquer on a separate lid, said lid being sterilized by said radiation.

3. A method according to claim 2, wherein said lids are formed from a continuous sheet of lidding material after sterilization.

4. A method according to claim 1, wherein said packaging material is selected from the class consisting of aluminium foil and laminates thereof with a plastics material.

5. A method according to claim 2, wherein said containers and said lids are heated to a temperature of from 60° C to 150° C by exposure to infrared light prior to the step of sterilizing with said dry-sterilizing radiation.

6. A method according to claim 1, wherein said lacquer is based on a plastics material selected from the class consisting of polyvinyl chloride and polyvinylidine chloride and copolymers thereof with vinylacetate and polyesters.

7. A method according to claim 1, wherein the lacquer is stabilized by including therein a stabilizing agent selected from the class consisting of saturated polyester resin, epoxy resin, polyacrylate and mixtures thereof.

8. In a method of aseptically packaging presterilized products, comprising sterilizing a continuous strip of packing material coated on at least one surface thereof with a heat-sealable lacquer, said sterilization including the step of exposing at least said lacquer-coated surface to dry-sterilizing radiation in an aseptic workspace, forming said strip into containers within said aseptic work-space, providing said pre-sterilized products in said containers and closing said containers by forming a hermetic seal between two coatings of said lacquer, the improvement which consists in using as the heat-sealable lacquer a lacquer stabilised against radiation damage occurring as a result of exposure to said dry-sterilizing radiation.

9. A method according to claim 8, wherein said packaging material is selected from the class consisting of aluminium foil and laminates thereof with a plastics material.

10. A method according to claim 8, wherein said containers and said lids are heated to a temperature of from 60° C to 150° C by exposure to infrared light prior to the step of sterilizing with said dry-sterilizing radiation.

11. A method according to claim 8, wherein said lacquer is based on a plastics material selected from the class consisting of polyvinyl chloride and polyvinylidine chloride and copolymers thereof with vinylacetate and polyesters.

12. A method according to claim 8, wherein the lacquer is stabilized by including therein a stabilizing agent selected from the class consisting of saturated polyester resin, epoxy resin, polyacrylate and mixtures thereof.

* * * * *

UNITED STATES PATENT AND TRADEMARK OFFICE
CERTIFICATE OF CORRECTION

PATENT NO. : 4,035,981
DATED : July 19, 1977
INVENTOR(S) : Johannes Braun et al.

It is certified that error appears in the above-identified patent and that said Letters Patent are hereby corrected as shown below:

Cover page, first column, after item [22], insert
--[30] Foreign Application Priority Data:
December 11, 1974   Switzerland   016482/74 --

Column 1, line 15, before "subsequently," "the" should read --then-- ;

line 64, insert --C-- after "25°".

Column 2, line 23, delete "be" ;

line 25, "kill of" should read --kill off-- .

Column 5, line 55, before "radiation" delete the bracket.

Signed and Sealed this

Second Day of May 1978

[SEAL]

Attest:

RUTH C. MASON
Attesting Officer

LUTRELLE F. PARKER
Acting Commissioner of Patents and Trademarks